United States Patent
Chen et al.

(10) Patent No.: US 11,962,182 B2
(45) Date of Patent: Apr. 16, 2024

(54) WIRELESS CHARGING DEVICE, THE METHOD THEREOF AND SECURITY DEVICE INCLUDING WIRELESS CHARGING DEVICE

(71) Applicants: Nuctech Company Limited, Beijing (CN); Tsinghua University, Beijing (CN)

(72) Inventors: Zhiqiang Chen, Beijing (CN); Yuanjing Li, Beijing (CN); Xianghao Wu, Beijing (CN); Yongning Chen, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 913 days.

(21) Appl. No.: 15/733,444

(22) PCT Filed: Jan. 21, 2020

(86) PCT No.: PCT/CN2020/073472
§ 371 (c)(1),
(2) Date: Jul. 30, 2020

(87) PCT Pub. No.: WO2020/168894
PCT Pub. Date: Aug. 27, 2020

(65) Prior Publication Data
US 2021/0203180 A1 Jul. 1, 2021

(30) Foreign Application Priority Data
Feb. 19, 2019 (CN) .......................... 201910124497.0

(51) Int. Cl.
*H02J 7/02* (2016.01)
*E05B 47/00* (2006.01)
*H02J 7/00* (2006.01)

(52) U.S. Cl.
CPC ................ *H02J 7/02* (2013.01); *E05B 47/00* (2013.01); *H02J 7/0047* (2013.01); *E05B 2047/0058* (2013.01); *E05B 2047/0082* (2013.01)

(58) Field of Classification Search
CPC ....................................................... H02J 50/00
See application file for complete search history.

(56) References Cited

U.S. PATENT DOCUMENTS

| 2013/0311798 A1 | 11/2013 | Sultenfuss et al. |
| 2014/0015336 A1* | 1/2014 | Weber ............... H02J 7/0047 307/104 |

(Continued)

FOREIGN PATENT DOCUMENTS

| CN | 105978070 A | | 9/2016 |
| CN | 106655423 | | 5/2017 |
| CN | 106655423 A | * | 5/2017 |
| CN | 109149709 A | | 1/2019 |
| CN | 109787315 A | | 5/2019 |

OTHER PUBLICATIONS

CN106655423 translation, Wireless charging method and device, Ren (Year: 2017).*

(Continued)

*Primary Examiner* — Drew A Dunn
*Assistant Examiner* — Tynese V McDaniel
(74) *Attorney, Agent, or Firm* — Schwegman Lundberg & Woessner, P.A.

(57) ABSTRACT

An embodiment of the present disclosure discloses a wireless charging device comprising a wireless receiving module, a controller, a first charging module, and a second charging module. The wireless receiving module is configured to receive a wireless charging signal in response to the wireless charging device being in a wireless sensing area, transmit a state indication signal to the controller, receive a charging indication signal from the controller, and determine whether to transmit the wireless charging signal to the first charging module according to the charging indication signal. The controller is configured to transmit the charging indication signal to the wireless receiving module according to the state indication signal, and in response to the charging indication signal instructing the wireless receiving module (Continued)

to transmit the wireless charging signal, output a control signal to the first charging module to control the first charging module to receive the wireless charging signal, charge the second charging module, and output an electrical signal. The first charging module is configured to, in response to receiving the control signal, receive the wireless charging signal, charge the second charging module, and output the electrical signal.

19 Claims, 4 Drawing Sheets

(56) References Cited

U.S. PATENT DOCUMENTS

| | | | |
|---|---|---|---|
| 2017/0018956 A1* | 1/2017 | Geiszler | H01F 38/14 |
| 2017/0040827 A1* | 2/2017 | Weber | H02J 50/80 |
| 2018/0301941 A1* | 10/2018 | Kim | G05F 1/66 |

OTHER PUBLICATIONS

"International Application Serial No. PCT/CN2020/073472, International Search Report dated Apr. 24, 2020", (Apr. 24, 2020), 4 pgs.
"International Application Serial No. PCT/CN2020/073472, Written Opinion dated Apr. 24, 2020", (Apr. 24, 2020), 5 pgs.
"Chinese Application Serial No. 201910124497.0, Office Action dated Apr. 13, 2023 w/ English Translation", (Apr. 13, 2023), 8 pgs.

* cited by examiner

WIRELESS CHARGING DEVICE, THE METHOD THEREOF AND SECURITY DEVICE INCLUDING WIRELESS CHARGING DEVICE

PRIORITY APPLICATIONS

This application is a U.S. National Stage Filing under 35 U.S.C. § 371 from International Application No. PCT/CN2020/073472, filed on Jan. 21, 2020, and published as WO2020/168894 on Aug. 27, 2020, which claims the benefit of priority to Chinese Patent Application No. 201910124497.0, filed on Feb. 19, 2019; the benefit of priority of each of which is hereby claimed herein, and which applications and publication are hereby incorporated herein by reference in their entireties.

TECHNICAL FIELD

The present disclosure relates to the field of electronic technology, and in particular, to a wireless charging device and a security device including the wireless charging device.

BACKGROUND

Reusable security devices such as electronic locks, smart locks, etc. are generally mounted on trucks, trains, or other vehicles to prevent objects to be checked (e.g., containers) from being opened without permission, thereby ensuring that items in the objects to be checked are not substituted secretly for articles of contraband. The security device includes a built-in charging device to power other modules in the security device. Therefore, the charging device is essential for normal operations of the security device. However, the charging device is usually charged through a wired interface (for example, a round hole power interface, a USB interface, a contact type power interface, etc.). Such a charging method using the wired interface has problems such as non-waterproof, reduced connector durability or failure due to a number of attachments and detachments, or the like.

Therefore, there is a need for a wireless charging device capable of overcoming the above-mentioned problems, a method thereof and a security device including the wireless charging device.

SUMMARY

According to an aspect of the present disclosure, a wireless charging device comprising a wireless receiving module, a controller, a first charging module, and a second charging module is provided, wherein:

the wireless receiving module is configured to receive a wireless charging signal from an external wireless transmitting module in response to the wireless charging device being in a wireless sensing area, transmit a state indication signal to the controller, receive a charging indication signal from the controller, and determine whether to transmit the wireless charging signal to the first charging module according to the charging indication signal, wherein the state indication signal comprises information indicating that the wireless charging device is in a wireless charging state and a level signal of the wireless charging signal;

the controller is connected to the wireless receiving module, and is configured to transmit the charging indication signal to the wireless receiving module according to the state indication signal, and in response to the charging indication signal instructing the wireless receiving module to transmit the wireless charging signal to the first charging module, output a control signal to the first charging module to control the first charging module to receive the wireless charging signal from the wireless receiving module, charge the second charging module, and output an electrical signal; and the first charging module is connected to the controller and the second charging module, and is configured to, in response to receiving the control signal, receive the wireless charging signal from the wireless receiving module, charge the second charging module, and output the electrical signal.

According to an embodiment of the present disclosure, the wireless receiving module is further configured to transmit the state indication signal to the controller in response to the wireless charging device not being in the wireless sensing area, wherein the state indication signal comprises information indicating that the wireless charging device is not in the wireless charging state; and the controller is further configured to: in response to the state indication signal indicating that the wireless charging device is not in the wireless charging state, transmit the charging indication signal to the wireless receiving module to instruct the wireless receiving module not to transmit the wireless charging signal to the first charging module.

According to an embodiment of the present disclosure, the controller is further configured to:

in response to the charging indication signal instructing the wireless receiving module not to transmit the wireless charging signal to the first charging module, output a control signal to the second charging module to control the second charging module to output an electrical signal; and wherein the second charging module is connected to the controller, and is configured to output the electrical signal in response to receiving the control signal.

According to an embodiment of the present disclosure, the first charging module is a power supply module, and the second charging module is a rechargeable battery.

According to an embodiment of the present disclosure, the wireless charging device further comprises:

a converter connected to the controller, the first charging module, and the second charging module, wherein the controller is further configured to transmit an activation command to the converter in response to receiving a charging request from a module to be powered, and the converter is configured to: upon receiving the activation command from the controller, in response to the charging indication signal instructing the wireless receiving module to transmit the wireless charging signal to the first charging module, receive the electrical signal from the first charging module, and convert the electrical signal to output the converted electrical signal to the module to be powered; and in response to the charging indication signal instructing the wireless receiving module not to transmit the wireless charging signal to the first charging module, receive the electrical signal from the second charging module, and convert the electrical signal to output the converted electrical signal to the module to be powered.

According to an embodiment of the present disclosure, the module to be powered is a locking device.

According to an embodiment of the present disclosure, the controller is further configured to:

in response to the state indication signal indicating that the wireless charging device is in the wireless charging state, determine whether the wireless charging device is in a normal charging state by comparing the level signal included in the state indication signal with a threshold value;

transmit the charging indication signal to the wireless receiving module to instruct the wireless receiving module to transmit the wireless charging signal to the first charging module, if the wireless charging device is in the normal charging state; otherwise transmit the charging indication signal to the wireless receiving module to instruct the wireless receiving module not to transmit the wireless charging signal to the first charging module.

According to an embodiment of the present disclosure, the controller is further configured to:

in response to the state indication signal indicating that the wireless charging device is in the wireless charging state, determine that the wireless charging device is in the normal charging state if the level signal is lower than the threshold value; otherwise, determine that the wireless charging device is in an abnormal charging state.

According to an embodiment of the present disclosure, the wireless charging device further comprises an output module connected to the controller, wherein the controller is further configured to:

when it is determined that the wireless charging device is in the abnormal charging state, transmit an abnormality indication signal to the output module to indicate that the wireless charging device is in the abnormal charging state, and the output module is configured to receive the abnormality indication signal from the controller and output the abnormality indication signal to a user.

According to an embodiment of the present disclosure, the wireless receiving module is further configured to:

transmit the wireless charging signal to the first charging module when the charging indication signal instructs the wireless receiving module to transmit the wireless charging signal to the first charging module; and not transmit the wireless charging signal to the first charging module when the charging indication signal instructs the wireless receiving module not to transmit the wireless charging signal to the first charging module.

According to another aspect of the present disclosure, a security device is provided, the security device comprises:

the wireless charging device according to the embodiment of the present disclosure; and a locking device connected to the wireless charging device and configured to receive the electrical signal from the wireless charging device to perform an unlocking or locking operation according to an external instruction.

According to another aspect of the present disclosure, a wireless charging method is provided, the method comprises:

determining, by a wireless receiving module, whether a wireless charging device is in a wireless sensing area, receiving a wireless charging signal from an external wireless transmitting module, and transmitting a state indication signal to a controller, wherein the state indication signal comprises information indicating that the wireless charging device is in a wireless charging state and a level signal of the wireless charging signal;

determining, by the controller, a charging indication signal according to the state indication signal, and transmitting the charging indication signal to the wireless receiving module;

receiving, by the wireless receiving module, the charging indication signal from the controller, and determining whether to transmit the wireless charging signal to a first charging module according to the charging indication signal;

in response to the charging indication signal instructing the wireless receiving module to transmit the wireless charging signal to the first charging module, outputting, by the controller, a control signal to the first charging module to control the first charging module to receive the wireless charging signal from the wireless receiving module, charge a second charging module, and output an electrical signal; and in response to receiving the control signal, receiving, by the first charging module, the wireless charging signal from the wireless receiving module, charging the second charging module, and outputting the electrical signal.

According to an embodiment of the present disclosure, the method further comprises:

in response to the wireless charging device not being in the wireless sensing area, transmitting, by the wireless receiving module, the state indication signal to the controller, wherein the state indication signal comprises information indicating that the wireless charging device is not in the wireless charging state; and in response to the state indication signal indicating that the wireless charging device is not in the wireless charging state, transmitting, by the controller, the charging indication signal to the wireless receiving module to instruct the wireless receiving module not to transmit the wireless charging signal to the first charging module.

According to an embodiment of the present disclosure, the method further comprises:

in response to the charging indication signal instructing the wireless receiving module not to transmit the wireless charging signal to the first charging module, outputting, by the controller, a control signal to the second charging module to control the second charging module to output an electrical signal; and in response to receiving the control signal, outputting, by the second charging module, the electrical signal.

According to an embodiment of the present disclosure, the first charging module is a power supply module, and the second charging module is a rechargeable battery.

According to an embodiment of the present disclosure, the method further comprises:

transmitting, by the controller, an activation command to a converter, in response to receiving a charging request from a module to be powered; and upon receiving the activation command from the controller, in response to the charging indication signal instructing the wireless receiving module to transmit the wireless charging signal to the first charging module, receiving, by the converter, the electrical signal from the first charging module and converting the electrical signal to output the converted electrical signal to the module to be powered; and in response to the charging indication signal instructing the wireless receiving module not to transmit the wireless charging signal to the first charging module, receiving, by the converter, the electrical signal from the second charging module and converting the electrical signal to output the converted electrical signal to the module to be powered.

According to an embodiment of the present disclosure, the module to be powered is a locking device.

According to an embodiment of the present disclosure, the method further comprises:

in response to the state indication signal indicating that the wireless charging device is in the wireless charging state, determining, by the controller, whether the wireless charging device is in a normal charging state by comparing the level signal included in the state indication signal with a threshold value;

transmitting the charging indication signal to the wireless receiving module to instruct the wireless receiving module to transmit the wireless charging signal to the first charging module, if the wireless charging device is in the normal charging state; otherwise transmitting the charging indication signal to the wireless receiving module to instruct the wireless receiving module not to transmit the wireless charging signal to the first charging module.

According to an embodiment of the present disclosure, the method further comprises:

in response to the state indication signal indicating that the wireless charging device is in the wireless charging state, determining, by the controller, that the wireless charging device is in the normal charging state, if the level signal is lower than the threshold value; otherwise, determining that the wireless charging device is in an abnormal charging state.

According to an embodiment of the present disclosure, the method further comprises:

when it is determined that the wireless charging device is in the abnormal charging state, transmitting, by the controller, an abnormality indication signal to an output module to indicate that the wireless charging device is in the abnormal charging state; and receiving, by the output module, the abnormality indication signal from the controller and outputting the abnormality indication signal to a user.

According to an embodiment of the present disclosure, the method further comprises:

transmitting, by the wireless receiving module, the wireless charging signal to the first charging module when the charging indication signal instructs the wireless receiving module to transmit the wireless charging signal to the first charging module; and not transmitting the wireless charging signal to the first charging module when the charging indication signal instructs the wireless receiving module not to transmit the wireless charging signal to the first charging module.

BRIEF DESCRIPTION OF THE DRAWINGS

The above and other objects, features, and advantages of the present disclosure will be more apparent from the following description of embodiments of the present disclosure with reference to the accompanying drawings, in which.

The drawings do not show all the circuits or structures of the embodiments. The same reference numbers are used throughout the drawings to refer to the same or like parts or features.

DETAILED DESCRIPTION

Hereinafter, embodiments of the present disclosure will be described with reference to the drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure.

The terminology as used herein is for the purpose of describing particular embodiments only and is not intended to limit the present disclosure. The words "a", "an", "the" and the like as used herein shall include the meanings of "a plurality of" or "multiple" as well, unless the context clearly indicates otherwise. Furthermore, the terms "including", "comprising", and the like as used herein indicate the presence of features, steps, operations, and/or components, but do not exclude the presence or addition of one or more other features, steps, operations, or components.

All terms (including technical and scientific terms) used herein have the meaning commonly understood by those skilled in the art, unless otherwise defined. It should be noted that the terms used herein should be interpreted to have meanings consistent with the context of this specification, and should not be interpreted in an idealized or overly formal manner.

Figure 1:
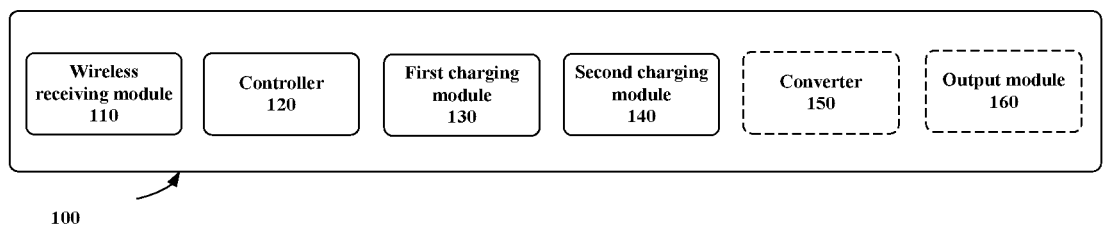
FIG. 1 illustrates a block diagram of a wireless charging device according to an embodiment of the present disclosure.

FIG. 1 illustrates a block diagram of a wireless charging device 100 according to an embodiment of the present disclosure. The wireless charging device 100 may include a wireless receiving module 110, a controller 120, a first charging module 130, and a second charging module 140.

The wireless receiving module 110 may be configured to receive a wireless charging signal from an external wireless transmitting module in response to the wireless charging device 100 being in a wireless sensing area, transmit a state indication signal to the controller 120, receive a charging indication signal from the controller 120, and determine whether to transmit the wireless charging signal to the first charging module 130 according to the charging indication signal. The state indication signal may include information indicating that the wireless charging device 100 is in a wireless charging state and a level signal of the wireless charging signal. The charging indication signal may indicate whether the wireless receiving module 110 transmits the wireless charging signal to the first charging module 130.

The controller 120 may be connected to the wireless receiving module 110, and may be configured to transmit a charging indication signal to the wireless receiving module 110 according to the state indication signal, and in response to the charging indication signal instructing the wireless receiving module 110 to transmit a wireless charging signal to the first charging module 130, output a control signal to the first charging module 130 to control the first charging module 130 to receive the wireless charging signal from the wireless receiving module 110, charge the second charging module 140, and output an electrical signal. The controller 120 may be further configured to: in response to the charging indication signal instructing the wireless receiving module 110 not to transmit a wireless charging signal to the first charging module 130, output a control signal to the second charging module 140 to control the second charging module 140 to output an electrical signal.

The first charging module 130 may be connected to the controller 120 and the second charging module 140, and may be configured to, in response to receiving a control signal, receive a wireless charging signal from the wireless receiving module 110, charge the second charging module 140, and output an electrical signal.

The wireless receiving module 110 may be further configured to transmit the state indication signal to the controller 120 in response to the wireless charging device 100 not being in the wireless sensing area, and the state indication signal includes information indicating that the wireless charging device 100 is not in a wireless charging state.

The controller 120 may be further configured to: in response to the state indication signal indicating that the wireless charging device 100 is not in the wireless charging state, transmit the charging indication signal to the wireless receiving module 110 to instruct the wireless receiving module 110 not to transmit a wireless charging signal to the first charging module 130, and output a control signal to the second charging module 140 to control the second charging module 140 to output an electrical signal.

The wireless receiving module 110 may be further configured to transmit the wireless charging signal to the first charging module 130 when the charging indication signal instructs the wireless receiving module 110 to transmit the wireless charging signal to the first charging module 130, and not transmit the wireless charging signal to the first charging module 130 when the charging indication signal instructs the wireless receiving module 110 not to transmit the wireless charging signal to the first charging module 130.

The second charging module 140 may be connected to the controller 120, and may be configured to output an electrical signal in response to receiving a control signal.

The first charging module 130 may be a power supply module, and the second charging module 140 may be a rechargeable battery.

The wireless charging device 100 may further include a converter 150 connected to the controller 120, the first charging module 130, and the second charging module 140. The controller 120 may be further configured to transmit an activation command to the converter 150 in response to receiving a charging request from a module to be powered. The module to be powered may be a locking device configured to lock an object to be checked (for example, a container) and equipped with a security device, and report a location of the object to be checked.

The converter 150 may be configured to: upon receiving an activation command from the controller 120, in response to the charging indication signal instructing the wireless receiving module 110 to transmit a wireless charging signal to the first charging module 130, receive the electrical signal from the first charging module 130, and convert the electrical signal to output a converted electrical signal to the module to be powered; and in response to the charging indication signal instructing the wireless receiving module 110 not to transmit a wireless charging signal to the first charging module 130, receive the electrical signal from the second charging module 140, and convert the electrical signal to output a converted electrical signal to the module to be powered.

The controller 120 may be further configured to: in response to the state indication signal indicating that the wireless charging device 100 is in the wireless charging state, determine whether the wireless charging device 100 is in a normal charging state by comparing the level signal included in the state indication signal with a threshold value; transmit the charging indication signal to the wireless receiving module 110 to instruct the wireless receiving module 110 to transmit the wireless charging signal to the first charging module 130, if the wireless charging device 100 is in the normal charging state; otherwise, transmit the charging indication signal to the wireless receiving module 110 to instruct the wireless receiving module 110 not to transmit the wireless charging signal to the first charging module 130.

The controller 120 may be further configured to: in response to the state indication signal indicating that the wireless charging device 100 is in the wireless charging state, determine that the wireless charging device 100 is in the normal charging state if the level signal is lower than the threshold value; otherwise, determine that the wireless charging device 100 is in an abnormal charging state.

The wireless charging device 100 may further include an output module 160 connected to the controller 120. When it is determined that the wireless charging device 100 is in the abnormal charging state, the controller 120 may be further configured to transmit an abnormality indication signal to the output module 160 to indicate that the wireless charging device 100 is in the abnormal charging state. The output module 160 may be configured to receive the abnormality indication signal from the controller 120 and output the abnormality indication signal to a user. When the user receives the abnormality indication signal, the user may check the wireless charging device 100 to repair a fault.

Figure 2A:
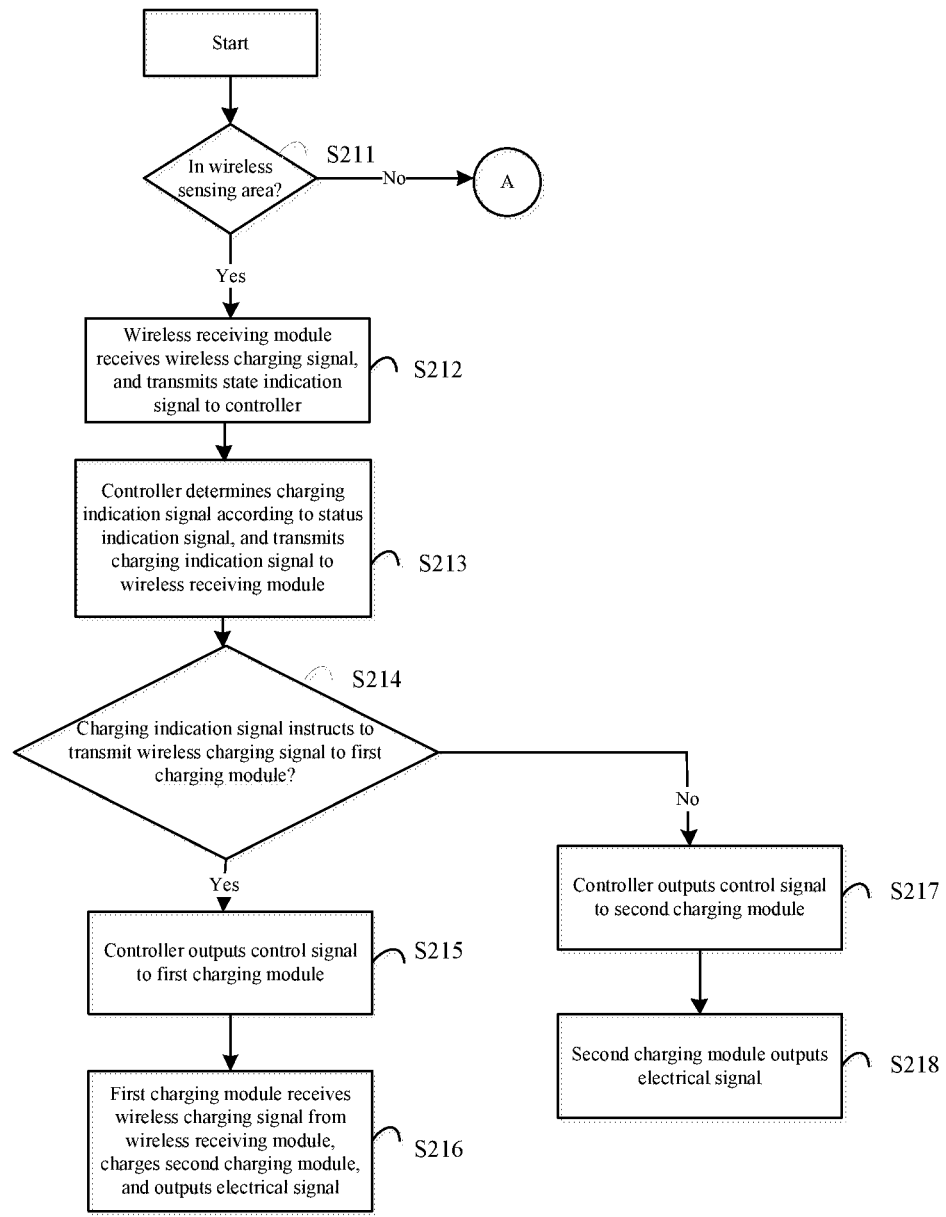
FIGS. 2A and 2B illustrate flowcharts of a method for charging a security device according to an embodiment of the present disclosure.
Figure 2B:
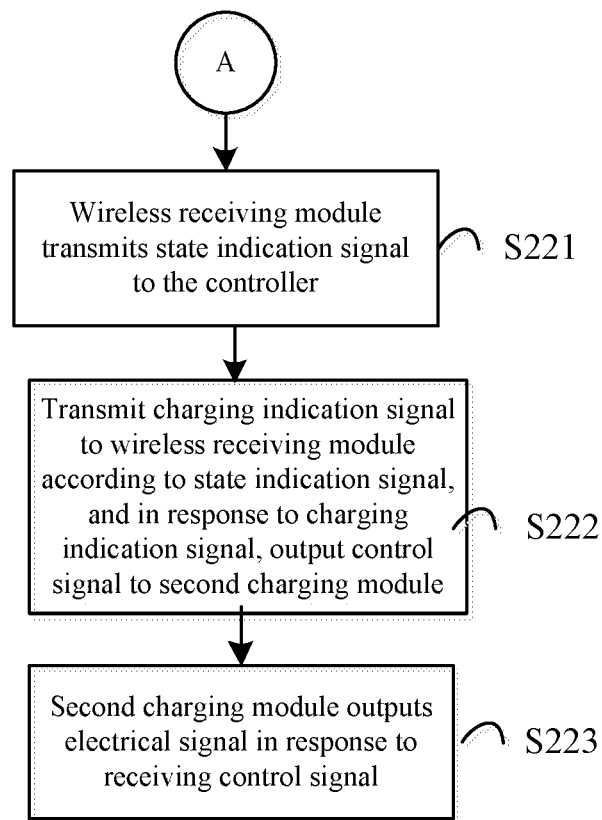

FIGS. 2A and 2B illustrate flowcharts of a method for charging a security device according to an embodiment of the present disclosure. The method for charging the security device will be described below with reference to FIGS. 2A and 2B in conjunction with FIG. 1. The flow of the method starts from step S211. In step S211, the wireless receiving module 110 may determine whether the wireless charging device 100 is within a wireless sensing area. if it is determined that the wireless charging device 100 is within the wireless sensing area, the wireless receiving module 110 may receive a wireless charging signal from an external wireless transmitting module and transmit a state indication signal to the controller 120 in step S212; otherwise, the method proceeds to the flow A. The state indication signal may include information indicating that the wireless charging device 100 is in a wireless charging state and a level signal of the wireless charging signal. In step S213, the controller 120 may determine a charging indication signal according to the state indication signal, and transmit the charging indication signal to the wireless receiving module 110. The charging indication signal may instruct the wireless receiving module 110 whether to transmit a wireless charging signal to the first charging module 130 or not. Accordingly, the wireless receiving module 110 may receive the charging indication signal from the controller 120 and determine whether to transmit the wireless charging signal to the first charging module 130 according to the charging indication signal. When the charging indication signal received by the wireless receiving module 110 instructs the wireless receiving module 110 to transmit the wireless charging signal to the first charging module 130, the wireless receiving module 110 may transmit the wireless charging signal to the first charging module 130. When the charging indication signal received by the wireless receiving module 110 instructs the wireless receiving module 110 not to transmit the wireless charging signal to the first charging module 130, the wireless receiving module 110 does not transmit the wireless charging signal to the first charging module 130.

Step S213 may include: in response to the state indication signal indicating that the wireless charging device 100 is in a wireless charging state, determining whether the wireless charging device 100 is in a normal charging state by comparing a level signal included in the state indication signal with a threshold value; transmitting a charging indication signal to the wireless receiving module 110 to instruct the wireless receiving module 110 to transmit a wireless charging signal to the first charging module 130, if the wireless charging device 100 is in the normal charging state; otherwise, transmitting the charging indication signal to the wireless receiving module 110 to instruct the wireless receiving module 110 not to transmit the wireless charging signal to the first charging module 130.

In response to the state indication signal indicating that the wireless charging device 100 is in the wireless charging state, determining whether the wireless charging device 100 is in a normal charging state by comparing a level signal included in the state indication signal with a threshold value may include: when the level signal is lower than the threshold value, the controller 120 determines that the wireless charging device 100 is in the normal charging state; otherwise, the controller 120 determines that the wireless charging device 100 is in an abnormal charging state. When the controller 120 determines that the wireless charging device 100 is in the abnormal charging state, the controller 120 transmits an abnormality indication signal to the output module 160 to indicate that the wireless charging device 100 is in the abnormal charging state. The output module 160 may receive the abnormality indication signal from the controller 120 and output the abnormality indication signal to a user. When the user receives the abnormality indication signal, the user may check the wireless charging device 100 to repair a fault.

In step S214, the controller 120 may determine whether the charging indication signal instructs the wireless receiving module 110 to transmit the wireless charging signal to the first charging module 130. When the charging indication signal instructs the wireless receiving module 110 to transmit the wireless charging signal to the first charging module 130, in step S215, the controller 120 may output a control signal to the first charging module 130 to control the first charging module 130 to receive the wireless charging signal from the wireless receiving module 110, charge the second charging module 140, and output an electrical signal. In step S216, in response to receiving the control signal, the first charging module 130 may receive the wireless charging signal from the wireless receiving module 110, charge the second charging module 140, and output the electrical signal.

When the charging indication signal instructs the wireless receiving module 110 not to transmit a wireless charging signal to the first charging module 130, in step S217, the controller 120 may output a control signal to the second charging module 140 to control the second charging module 140 to output an electrical signal. In step S218, the second charging module 140 may output the electrical signal in response to receiving the control signal. The first charging module 130 may be a power supply module, and the second charging module 140 may be a rechargeable battery.

In step S221, the wireless receiving module 110 may transmit a state indication signal to the controller 120 in response to the wireless charging device 100 not being in the wireless sensing area, the state indication signal includes information indicating that the wireless charging device 100 is not in a wireless charging state.

In step S222, the controller 120 may transmit the charging indication signal to the wireless receiving module 110 to instruct the wireless receiving module 110 not to transmit a wireless charging signal to the first charging module 130 in response to the state indication signal indicating that the wireless charging device 100 is not in the wireless charging state, and output a control signal to the second charging module 140 to control the second charging module 140 to output the electrical signal.

In step S223, the second charging module 140 may output the electrical signal in response to receiving the control signal.

The method may further include: in response to receiving a charging request from a module to be powered, transmitting, by the controller 120, an activation command to the converter 150. The module to be powered may be a locking device configured to lock an object to be checked (for example, a container) and equipped with a security device.

Upon receiving the activation command from the controller 120, the converter 150 may receive the electrical signal from the first charging module 130, and output a converted electrical signal, in response to the charging indication signal instructing the wireless receiving module 110 to transmit a wireless charging signal to the first charging module 130; or receive the electrical signal from the second charging module 140 and convert the electrical signal to output a converted electrical signal to the module to be powered, in response to the charging indication signal instructing the wireless receiving module 110 not to transmit the wireless charging signal to the first charging module 130.

Figure 3:
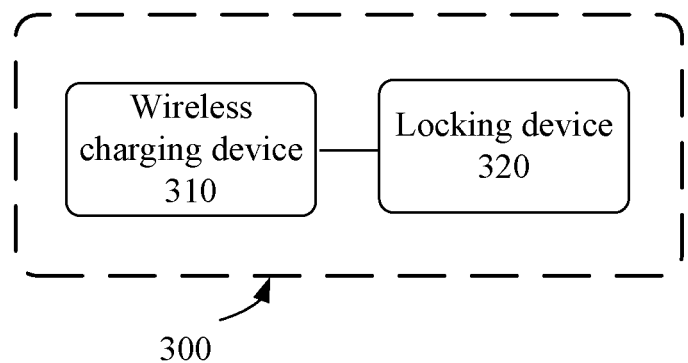
FIG. 3 illustrates a block diagram of a security device according to an embodiment of the present disclosure.

FIG. 3 illustrates a block diagram of a security device 300 according to an embodiment of the present disclosure. The security device 300 may include a wireless charging device 310 according to an embodiment of the present disclosure; and a locking device 320 connected to the wireless charging device 310 and configured to receive an electrical signal from the wireless charging device 310 to perform an unlock or lock operation according to an external instruction. The external instruction may be received from an electronic key, a remote controller, or the like.

Figure 4:
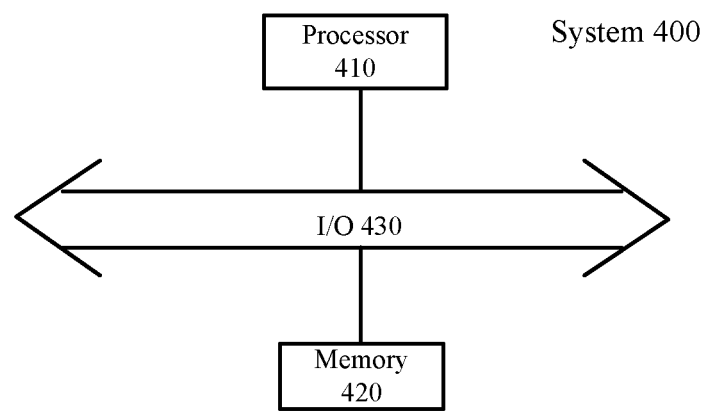
FIG. 4 illustrates a schematic diagram of a system for charging a security device according to an embodiment of the present disclosure.

FIG. 4 illustrates a schematic diagram of a system 400 for charging a security device according to an embodiment of the present disclosure. The system 400 may include a processor 410, such as a digital signal processor (DSP). The processor 410 may be a single device or a plurality of devices for performing different actions of the processes described herein. The system 400 may further include an input/output (I/O) device 430 for receiving signals from other entities or transmitting signals to other entities.

In addition, the system 400 may include a memory 420, which may be embodied as a non-volatile or volatile memory, such as an electrically erasable and programmable read-only memory (EEPROM), a flash memory, and the like. The memory 420 may store computer-readable instructions that, when executed by the processor 410, cause the processor to perform the actions described herein.

Some block diagrams and/or flowcharts are shown in the drawings. It should be understood that some blocks or combinations thereof in block diagrams and/or flowcharts may be implemented by computer program instructions. These computer program instructions may be provided to a processor of a general purpose computer, special purpose computer, or other programmable data processing device, so that when executed by the processor, these instructions may create a device for implementing the functions/operations illustrated in these block diagrams and/or flowcharts.

Therefore, the techniques described in the present disclosure may be implemented in the form of hardware and/or software (including firmware, microcode, etc.). Additionally, the techniques described in the present disclosure may take the form of a computer program product on a computer-readable medium storing instructions, and the computer program product may be used by or in conjunction with an instruction execution system (e.g., one or more processors). In the context of the present disclosure, a computer-readable medium may be any medium capable of including, storing, transferring, propagating, or transmitting instructions. For example, the computer-readable medium may include, but is not limited to, electrical, magnetic, optical, electromagnetic, infrared, or semiconductor systems, apparatuses, devices, or propagation mediums. Specific examples of computer-readable medium include: magnetic storage devices such as magnetic tapes or hard disk drives (HDD); optical storage devices such as optical disks (CD-ROM); memories such as random access memories (RAM) or flash memories; and/or wired/wireless communication links.

The foregoing detailed description has explained numerous embodiments of wireless charging devices and security devices including wireless charging devices by using schematic diagrams, flowcharts and/or examples. Where such a schematic diagram, flowchart and/or example includes one or more functions and/or operations, those skilled in the art should understand that each function and/or operation in this schematic diagram, flowchart or example may be implemented individually and/or collectively by various structures, hardware, software, firmware, or essentially any combination thereof. In one embodiment, portions of the subject matter described in the embodiments of the present disclosure may be implemented by application specific integrated circuits (ASICs), field programmable gate arrays (FPGAs), digital signal processors (DSPs), or other integrated formats. However, those skilled in the art should recognize that some aspects of the embodiments disclosed herein may be equivalently implemented in an integrated circuit, in whole or in part, implemented as one or more computer programs running on one or more computers (e.g., implemented as one or more programs running on one or more computer systems), implemented as one or more programs running on one or more processors (e.g., implemented as one or more programs running on one or more microprocessors), implemented as firmware, or substantially implemented as any combination of the above. And those skilled in the art will have the ability of designing circuits and/or writing software and/or firmware code according to the present application. In addition, those skilled in the art will recognize that the mechanisms of the subject matter described in the present disclosure can be distributed as various forms of program products, and regardless of the specific type of signal bearing mediums actually used to perform the distribution, the exemplary embodiments of the subject matter described in the present disclosure are applicable. Examples of signal bearing mediums include, but are not limited to: recordable mediums such as floppy disks, hard drives, compact discs (CDs), digital versatile discs (DVDs), digital magnetic tapes, computer memories, etc.; and transmission mediums such as digital and/or analog communication mediums (for example, optical fiber cables, waveguides, wired communication links, wireless communication links, etc.).

We claim:

1. A wireless charging device comprising a wireless receiving module, a controller, a first charging module, and a second charging module, wherein:
   the wireless receiving module is configured to receive a wireless charging signal from an external wireless transmitting module in response to the wireless charging device being in a wireless sensing area, transmit a state indication signal to the controller, receive a charging indication signal from the controller, and determine whether to transmit the wireless charging signal to the first charging module according to the charging indication signal, wherein the state indication signal comprises information indicating that the wireless charging device is in a wireless charging state and a level signal of the wireless charging signal;
   the controller is connected to the wireless receiving module, and is configured to transmit the charging indication signal to the wireless receiving module according to the state indication signal, and in response to the charging indication signal instructing the wireless receiving module to transmit the wireless charging signal to the first charging module, output a control signal to the first charging module to control the first charging module to receive the wireless charging signal from the wireless receiving module, charge the second charging module, and output an electrical signal; and
   the first charging module is connected to the controller and the second charging module, and is configured to, in response to receiving the control signal, receive the wireless charging signal from the wireless receiving module, charge the second charging module, and output the electrical signal;
   wherein the controller is further configured to:
      in response to the state indication signal indicating that the wireless charging device is in the wireless charging state, determine whether the wireless charging device is in a normal charging state by comparing the level signal included in the state indication signal with a threshold value;
      transmit the charging indication signal to the wireless receiving module to instruct the wireless receiving module to transmit the wireless charging signal to the first charging module, if the wireless charging device is in the normal charging state; otherwise
      transmit the charging indication signal to the wireless receiving module to instruct the wireless receiving module not to transmit the wireless charging signal to the first charging module.

2. The wireless charging device according to claim 1, wherein the wireless receiving module is further configured to transmit the state indication signal to the controller in response to the wireless charging device not being in the wireless sensing area, wherein the state indication signal comprises information indicating that the wireless charging device is not in the wireless charging state; and
   the controller is further configured to: in response to the state indication signal indicating that the wireless charging device is not in the wireless charging state, transmit the charging indication signal to the wireless receiving module to instruct the wireless receiving module not to transmit the wireless charging signal to the first charging module.

3. The wireless charging device according to claim 2, wherein the controller is further configured to:
   in response to the charging indication signal instructing the wireless receiving module not to transmit the wireless charging signal to the first charging module, output a control signal to the second charging module to control the second charging module to output an electrical signal; and
   wherein the second charging module is connected to the controller, and is configured to output the electrical signal in response to receiving the control signal.

4. The wireless charging device according to claim 3, further comprising:
   a converter connected to the controller, the first charging module, and the second charging module, wherein the controller is further configured to transmit an activation command to the converter in response to receiving a charging request from a module to be powered, and the converter is configured to: upon receiving the activation command from the controller, in response to the charging indication signal instructing the wireless receiving module to transmit the wireless charging signal to the first charging module, receive the electrical signal from the first charging module, and convert the electrical signal to output the converted electrical signal to the module to be powered; and in response to the charging indication signal instructing the wireless receiving module not to transmit the wireless charging signal to the first charging module, receive the electrical signal from the second charging module, and convert the electrical signal to output the converted electrical signal to the module to be powered.

5. The wireless charging device according to claim 4, wherein the module to be powered is a locking device.

6. The wireless charging device according to claim 1, wherein the first charging module is a power supply module, and the second charging module is a rechargeable battery.

7. The wireless charging device according to claim 1, wherein the controller is further configured to:
in response to the state indication signal indicating that the wireless charging device is in the wireless charging state, determine that the wireless charging device is in the normal charging state if the level signal is lower than the threshold value; otherwise, determine that the wireless charging device is in an abnormal charging state.

8. The wireless charging device according to claim 7, further comprising an output module connected to the controller, wherein the controller is further configured to:
when it is determined that the wireless charging device is in the abnormal charging state, transmit an abnormality indication signal to the output module to indicate that the wireless charging device is in the abnormal charging state, and
the output module is configured to receive the abnormality indication signal from the controller and output the abnormality indication signal to a user.

9. The wireless charging device according to claim 1, wherein the wireless receiving module is further configured to:
transmit the wireless charging signal to the first charging module when the charging indication signal instructs the wireless receiving module to transmit the wireless charging signal to the first charging module; and
not transmit the wireless charging signal to the first charging module when the charging indication signal instructs the wireless receiving module not to transmit the wireless charging signal to the first charging module.

10. A security device comprising:
the wireless charging device according to claim 1; and
a locking device connected to the wireless charging device and configured to receive the electrical signal from the wireless charging device to perform an unlocking or locking operation according to an external instruction.

11. A wireless charging method comprising:
determining, by a wireless receiving module, whether a wireless charging device is in a wireless sensing area, receiving a wireless charging signal from an external wireless transmitting module, and transmitting a state indication signal to a controller, wherein the state indication signal comprises information indicating that the wireless charging device is in a wireless charging state and a level signal of the wireless charging signal;

determining, by the controller, a charging indication signal according to the state indication signal, and transmitting the charging indication signal to the wireless receiving module;

receiving, by the wireless receiving module, the charging indication signal from the controller, and determining whether to transmit the wireless charging signal to a first charging module according to the charging indication signal;

in response to the charging indication signal instructing the wireless receiving module to transmit the wireless charging signal to the first charging module, outputting, by the controller, a control signal to the first charging module to control the first charging module to receive the wireless charging signal from the wireless receiving module, charge a second charging module, and output an electrical signal;

in response to receiving the control signal, receiving, by the first charging module, the wireless charging signal from the wireless receiving module, charging the second charging module, and outputting the electrical signal;

in response to the state indication signal indicating that the wireless charging device is in the wireless charging state, determining, by the controller, whether the wireless charging device is in a normal charging state by comparing the level signal included in the state indication signal with a threshold value;

transmitting the charging indication signal to the wireless receiving module to instruct the wireless receiving module to transmit the wireless charging signal to the first charging module, if the wireless charging device is in the normal charging state; otherwise transmitting the charging indication signal to the wireless receiving module to instruct the wireless receiving module not to transmit the wireless charging signal to the first charging module.

12. The method according to claim 11, further comprising:
in response to the wireless charging device not being in the wireless sensing area, transmitting, by the wireless receiving module, the state indication signal to the controller, wherein the state indication signal comprises information indicating that the wireless charging device is not in the wireless charging state; and
in response to the state indication signal indicating that the wireless charging device is not in the wireless charging state, transmitting, by the controller, the charging indication signal to the wireless receiving module to instruct the wireless receiving module not to transmit the wireless charging signal to the first charging module.

13. The method according to claim 12, further comprising:
in response to the charging indication signal instructing the wireless receiving module not to transmit the wireless charging signal to the first charging module, outputting, by the controller, a control signal to the second charging module to control the second charging module to output an electrical signal; and
in response to receiving the control signal, outputting, by the second charging module, the electrical signal.

14. The method according to claim 13, further comprising:
- transmitting, by the controller, an activation command to a converter, in response to receiving a charging request from a module to be powered; and
- upon receiving the activation command from the controller, in response to the charging indication signal instructing the wireless receiving module to transmit the wireless charging signal to the first charging module, receiving, by the converter, the electrical signal from the first charging module and converting the electrical signal to output the converted electrical signal to the module to be powered; and in response to the charging indication signal instructing the wireless receiving module not to transmit the wireless charging signal to the first charging module, receiving, by the converter, the electrical signal from the second charging module and converting the electrical signal to output the converted electrical signal to the module to be powered.

15. The method according to claim 14, wherein the module to be powered is a locking device.

16. The method according to claim 11, wherein the first charging module is a power supply module, and the second charging module is a rechargeable battery.

17. The method according to claim 11, further comprising:
- in response to the state indication signal indicating that the wireless charging device is in the wireless charging state, determining, by the controller, that the wireless charging device is in the normal charging state, if the level signal is lower than the threshold value; otherwise, determining that the wireless charging device is in an abnormal charging state.

18. The method according to claim 17, further comprising:
- when it is determined that the wireless charging device is in the abnormal charging state, transmitting, by the controller, an abnormality indication signal to an output module to indicate that the wireless charging device is in the abnormal charging state; and
- receiving, by the output module, the abnormality indication signal from the controller and outputting the abnormality indication signal to a user.

19. The method according to claim 11, further comprising:
- transmitting, by the wireless receiving module, the wireless charging signal to the first charging module when the charging indication signal instructs the wireless receiving module to transmit the wireless charging signal to the first charging module; and
- not transmitting the wireless charging signal to the first charging module when the charging indication signal instructs the wireless receiving module not to transmit the wireless charging signal to the first charging module.

* * * * *